United States Patent [19]
Horikawa

[11] Patent Number: 5,722,085
[45] Date of Patent: Feb. 24, 1998

[54] TERMINAL ADAPTER, SWITCHING EQUIPMENT ANCILLARY DEVICE AND DATA COMMUNICATION SYSTEM

[75] Inventor: Kiyotaka Horikawa, Tokyo, Japan

[73] Assignee: NEC Corporation, Tokyo, Japan

[21] Appl. No.: 529,443

[22] Filed: Sep. 18, 1995

[30] Foreign Application Priority Data

Sep. 20, 1994 [JP] Japan .................................. 6-224361

[51] Int. Cl.⁶ .................................................. H04M 11/00
[52] U.S. Cl. ............................................................ 455/557
[58] Field of Search ............................... 379/58, 59, 60; 455/10, 33.1, 33.2, 54.2, 557

[56] References Cited

U.S. PATENT DOCUMENTS

| | | | |
|---|---|---|---|
| Re. 34,034 | 8/1992 | O'Sullivan | 455/33.1 X |
| 4,697,281 | 9/1987 | O'Sullivan | 455/33.1 X |
| 4,984,290 | 1/1991 | Levine et al. | 455/33.2 |
| 5,257,397 | 10/1993 | Barzegar et al. | 379/59 |
| 5,416,828 | 5/1995 | Hiramatsu et al. | 455/557 |
| 5,425,051 | 6/1995 | Mahany | 455/557 X |
| 5,471,470 | 11/1995 | Sharma et al. | 370/81 |
| 5,497,382 | 3/1996 | Levine et al. | 455/10 X |
| 5,526,399 | 6/1996 | Kameda | 379/58 |
| 5,570,389 | 10/1996 | Rossi | 455/54.2 |
| 5,590,133 | 12/1996 | Billstrom et al. | 379/60 X |

FOREIGN PATENT DOCUMENTS 63-105537   5/1988   Japan .
4-152746    5/1992   Japan .

OTHER PUBLICATIONS

V.42 ANNEX Modem Communication Procedure, pp. 85-125.

Stage-2 Cellular Service Description, Async Data and Group-3 Fax Services, Jun. 1994, pp. 1-68 with Table of Contents.

*Primary Examiner*—Allen R. MacDonald
*Assistant Examiner*—Scott Richardson
*Attorney, Agent, or Firm*—Foley & Lardner

[57] ABSTRACT

Each of a terminal adapter and a switching equipment ancillary device has a protocol controller for analyzing and controlling a communication protocol control signal transmitted from a data terminal, so that a modem interface can directly be set to an originate mode or an answer mode. As a mobile station has no modem function, the switching equipment ancillary device and a modem terminal are synchronized with each other by a clock signal, and transmit and receive data therebetween. A transmission delay caused by a retransmission effected under error correction control on a communication line is adjusted by flow control between the modem interface and the modem terminal.

11 Claims, 3 Drawing Sheets

5,722,085

1

TERMINAL ADAPTER, SWITCHING EQUIPMENT ANCILLARY DEVICE AND DATA COMMUNICATION SYSTEM

BACKGROUND OF THE INVENTION

1. Field of the Invention

The present invention relates to a communication system for data communications, and more particularly to a communication system including radio transmission paths, such as a digital automobile telephone system.

2. Description of the Prior Art

In data communications in a digital automobile telephone system, it has been customary to effect only FEC (forward-error correction) control and interleaving as error correction control between a mobile station and a switching equipment ancillary device, and to carry out data communications according to communication protocols used by conventional analog data modems between a mobile station and a fixed station.

FIG. 1 of the accompanying drawings shows in block form a system arrangement for data communications in a conventional digital automobile telephone system as a data communication system.

As shown in FIG. 1, the conventional digital automobile telephone system comprises switching equipment 3, a switching equipment ancillary device 4', a mobile station 1', and a fixed station 6. The mobile station 1', the switching equipment 3, and the switching equipment ancillary device 4' are interconnected by a communication line 2, and the fixed station 6, the switching equipment 3, and the switching equipment ancillary device 4' are interconnected by a public telephone network 5.

The mobile station 1' comprises a data terminal 10 such as a PC (personal computer) or the like, a modem terminal 24 for effecting data communications according to communication protocols prescribed by ITU-T recommendations V.42 ANNEX, a modem adapter 25 for performing FEC control and interleaving between itself and the switching equipment ancillary device 4', and a mobile unit 30. The fixed station 6 comprises a data terminal 62 and a modem terminal 61.

Data communications between the mobile station 1' and the fixed station 6 will be described below. Before data communications are started or while data communications are being in progress, a mode is established for the modem terminal 24 of the mobile station 1' and the modem terminal 61 of the fixed station 6 by commands from the data terminals 10, 62, e.g., AT commands (commands for modems developed by Hayes, Inc., U.S.A.).

In the mobile station 1', a connection request signal for connecting the switching equipment ancillary device 4' and the modem adapter 25 to each other is transmitted from the mobile unit 30 to the switching equipment 3. The switching equipment ancillary device 4' is started by the switching equipment 3, and the modem adapter 25 is started by the mobile unit 30. A command for starting negotiations for communication protocols is entered from the data terminal 10 to activate the modem terminal 24.

In the fixed station 6, a command for starting negotiations for communication protocols is entered from the data terminal 62 to activate the modem terminal 61.

When FEC synchronization is established between the modem adapter 25 and the switching equipment ancillary device 4', negotiations for communication protocols are conducted between the modem terminal 24 of the mobile station 1' and the modem terminal 61 of the fixed station 6. When negotiations are completed successfully, data communications are initiated according to the communication protocols prescribed by ITU-T recommendations V.42 ANNEX.

During the data communications, the modem adapter 25 of the mobile station 1' and the switching equipment ancillary device 4' effect a control process for preventing data dropouts or errors based on FEC and interleaving.

For more details of the above conventional digital automobile telephone system, reference should be made to Japanese patent laid-open Nos. 152746/92 and 105537/88.

However, the above data communication system has suffered the following problems:

(1) while FEC control and interleaving are relied on as error correction control, a clock signal in the modem terminals and a clock signal in the switching equipment ancillary device tend to be shifted slightly out of synchronism with each other.

(2) A transmission delay caused by a retransmission under error correction control between the terminals on the transmission path is liable to bring about a timeout condition of a timer on data communication protocols between the mobile and fixed stations. The timer is included in each of the modem terminals, and serves to cut off communications when data can no longer be continuously received.

(3) The switching equipment ancillary device is started by an MNP communication request upon entry of a special service code from the mobile station (mobile unit). Thereafter, when an answer mode command is entered from the data terminal, the modem terminal transmits an answer tone and a carrier. According to RCR-27B, the switching equipment ancillary device is capable of detecting at least a carrier. If the switching equipment ancillary device detects a carrier in 10 seconds after it has been started, then the switching equipment ancillary device operates within an answer mode. If the switching equipment ancillary device detects a carrier after elapse of 10 seconds (timeout) from its start, then the switching equipment ancillary device operates in an originate mode. Therefore, the switching equipment ancillary device is set to one of different operation modes depending on whether there is a carrier or not. For modem communications between mobile stations, for example, the mobile stations are connected in their originate modes even if an answer mode command is entered from one of the mobile stations after elapse of 10 seconds or more from the start of the switching equipment ancillary device. The same condition results if originate and answer mode commands are entered in the order named. Since the switching equipment ancillary device is set to the originate mode or the answer mode depending on whether there is a carrier from the terminal or not within 10 seconds after the switching equipment has started the switching equipment ancillary device, as described above, there are limitations on the time at and the direction in which to enter a command for initiating negotiations. The period of 10 seconds after the switching equipment ancillary device has been started is needed to establish an operation mode for the switching equipment ancillary device, and hence no data communications can take place in this period.

SUMMARY OF THE INVENTION

It is therefore an object of the present invention to provide a terminal adapter for preventing a clock signal in a modem terminal and a clock signal in a switching equipment ancillary device from being shifted out of synchronism with each other.

Another object of the present invention is to provide a switching equipment ancillary device capable of preventing adverse effects of a transmission delay produced by retransmission control which is effected due to a data error on a transmission path.

Still another object of the present invention is to provide a data communication system which allows an originate mode or an answer mode to be directly established by a mode setting command entered from the data terminal of a mobile station.

Yet another object of the present invention is to provide a data communication method carried out by the above data communication system.

According to the present invention, there is provided a terminal adapter for use in a mobile station of a data communication system, comprising means for interfacing with a data terminal, means for analyzing and controlling a communication protocol control signal transmitted to and received from the data terminal, and means for effecting ARQ control as an error correction control on a transmission path connected to switching equipment of the data communication system.

According to the present invention, there is also provided a switching equipment ancillary device for effecting data communications between switching equipment of a data communication system and a mobile station, which includes a terminal adapter having means for interfacing with a data terminal, means for analyzing and controlling a communication protocol control signal transmitted to and received from the data terminal, and means for effecting ARQ control as an error correction control on a transmission path connected to the switching equipment, the switching equipment ancillary device comprising means for controlling communication protocols matching transmission path characteristics between the switching equipment and the data terminal, means for effecting data communications with analog data modems, and means for effecting flow control upon data communications between the analog data modems.

According to the present invention, there is further provided a data communication system comprising switching equipment, a mobile station connected to the switching equipment through a communication line, and including a data terminal, a mobile unit, and a terminal adapter having means for interfacing with the data terminal, means for analyzing and controlling a communication protocol control signal transmitted to and received from the data terminal, and means for effecting ARQ control as an error correction control on a transmission path connected to the switching equipment, a fixed station connected to the switching equipment through a public telephone network and having a modem terminal and a data terminal, and a switching equipment ancillary device including means for controlling communication protocols matching transmission path characteristics between the switching equipment and the data terminal, means for effecting data communications with analog data modems, and means for effecting flow control upon data communications between the analog data modems.

According to the present invention, there is also provided a data communication method carried out by the data communication system described above, comprising the steps of entering an originate mode call request command and a fixed station telephone number from the data terminal into the terminal adapter, discriminating the originate mode call request command and the fixed station telephone number in the terminal adapter, and indicating the fixed station telephone number to the mobile unit, transmitting the indicated fixed station telephone number from the mobile unit and connecting the mobile unit to the fixed station, sending a connection request from the terminal adapter through the mobile unit to the switching equipment for connection to the switching equipment ancillary device, starting the switching equipment ancillary device from the switching equipment to establish ARQ synchronization between the terminal adapter and the switching equipment ancillary device, transmitting an answer tone from the fixed station to the switching equipment ancillary device when the incoming call from the mobile station is detected by the fixed station, transmitting an originate mode call request command from the terminal adapter to the switching equipment ancillary device, starting negotiations for communication protocols between the switching equipment ancillary device and the fixed station when the switching equipment ancillary device receives the originate mode call request command, indicating completion of the negotiations from the switching equipment ancillary device to the terminal adapter when the negotiations are completed successfully, and transmitting and receiving data between the data terminal of the mobile station and the data terminal of the fixed station through the terminal adapter, the mobile unit, switching equipment and the switching equipment ancillary device.

Since the mobile station has no modem function, it is not necessary for the mobile station and the switching equipment ancillary device to be arranged for clock synchronization with the fixed station, thus preventing clock signals from being shifted out of synchronism.

With the switching equipment ancillary device having a modem interface, it is possible to effect flow control between the modem terminals, for thereby preventing adverse effects of a transmission delay produced by retransmission control which is effected due to a data error on the transmission path. If a modem terminal has a data processing speed lower than a data transmission speed, then data will overflow a buffer of the modem when the modem continuously receives the data. To solve this problem, the flow control is carried out to request a companion modem to interrupt data transmission when the data has reached a predetermined amount in the buffer, and to control the companion modem to resume data transmission when the data can be processed by the buffer.

The terminal adapter has a function to analyze and control communication protocol control signals, and the switching equipment ancillary device has a function to analyze and control communication protocol control signals, with interfaces between the terminal adapter and the switching equipment ancillary device, so that modem interface can directly be set to an originate mode or an answer mode, preventing operation modes from being unmatched between the modem terminals due to command entry times. Specifically, heretofore, retransmission control has been effected according to MNP protocols while the modem terminals are being connected, but communications tend to be cut off for the above two reasons. According to the present invention, since retransmission control, i.e., ARQ control on a radio transmission line, and inter-modem flow control on a general transmission line, are effected, it is possible to prevent operation modes from being unmatched between the modem terminals due to command entry times.

The above and other objects, features, and advantages of the present invention will become apparent from the following description with reference to the accompanying drawings which illustrate examples of the present invention.

DETAILED DESCRIPTION OF THE PREFERRED EMBODIMENT

Figure 1:
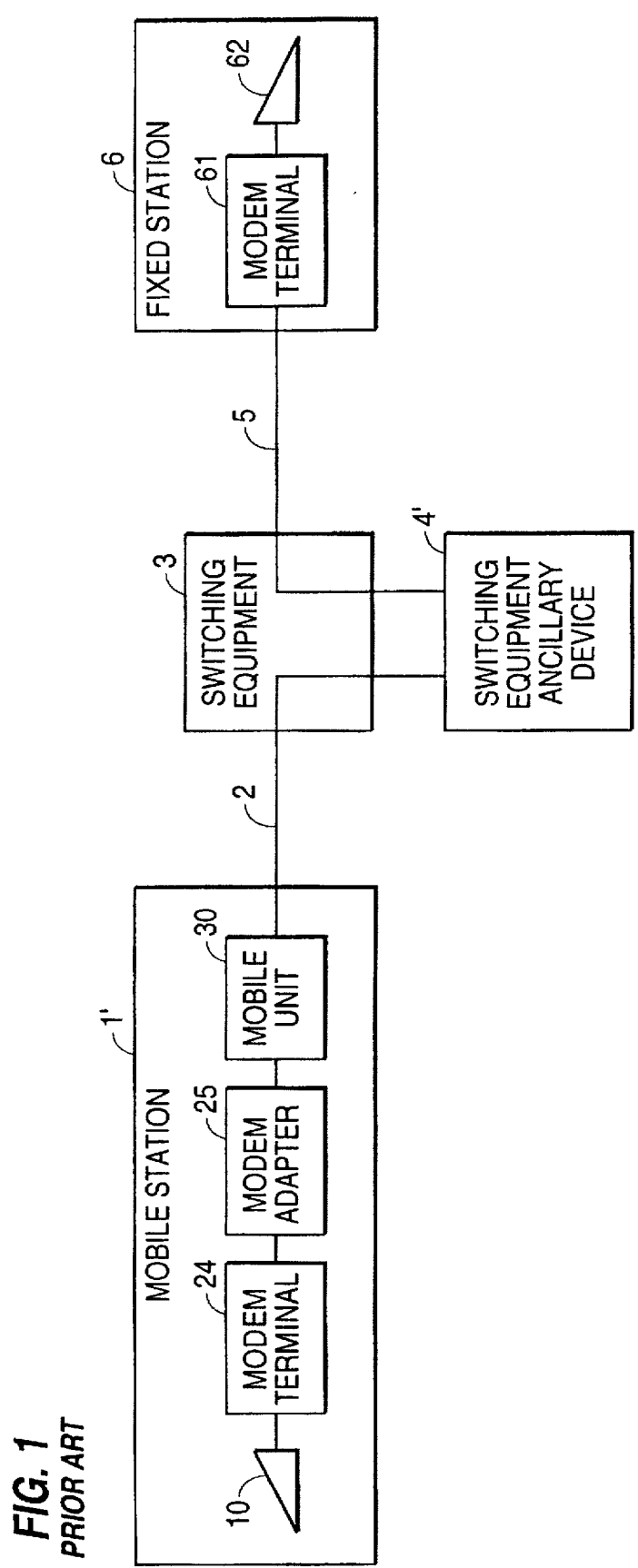
FIG. 1 is a block diagram of a conventional data communication system.
Figure 2:
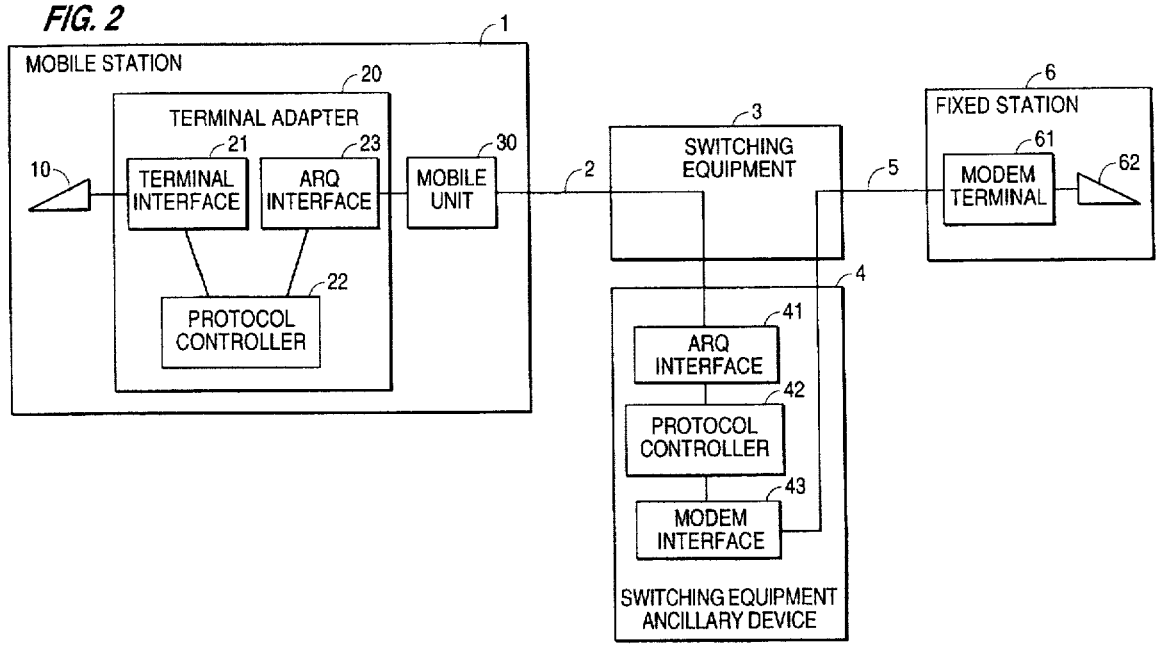
FIG. 2 is a block diagram of a data communication system according to the present invention.

As shown in FIG. 2, a data communication system according to the present invention comprises a mobile station 1, a communication line 2, switching equipment 3, a switching equipment ancillary device 4, a public telephone network 5, and a fixed station 6.

The mobile station 1 has a data terminal 10, a terminal adapter 20, and a mobile unit 30. The terminal adapter 20 comprises a terminal interface 21 for interfacing with the data terminal 10, a protocol controller 22 for analyzing and controlling communication protocol control signals transmitted to and received from the data terminal 10, and an ARQ (automatic request for repetition) interface 23 for effecting ARQ control as error correction control on a transmission path between the mobile station 1 and the switching equipment ancillary device 4.

The switching equipment ancillary device 4 comprises an ARQ interface 41 for effecting ARQ control as error correction control in relation to the mobile station 1, a protocol controller 42 for analyzing and controlling communication protocol control signals transmitted to and received from the mobile station 1, and a modem interface 43 for communicating with the fixed station 6 according to conventional communication protocols.

The fixed station 6 has a modem terminal 61 for effecting communications according to conventional communication protocols, and a data terminal 62.

Figure 3:
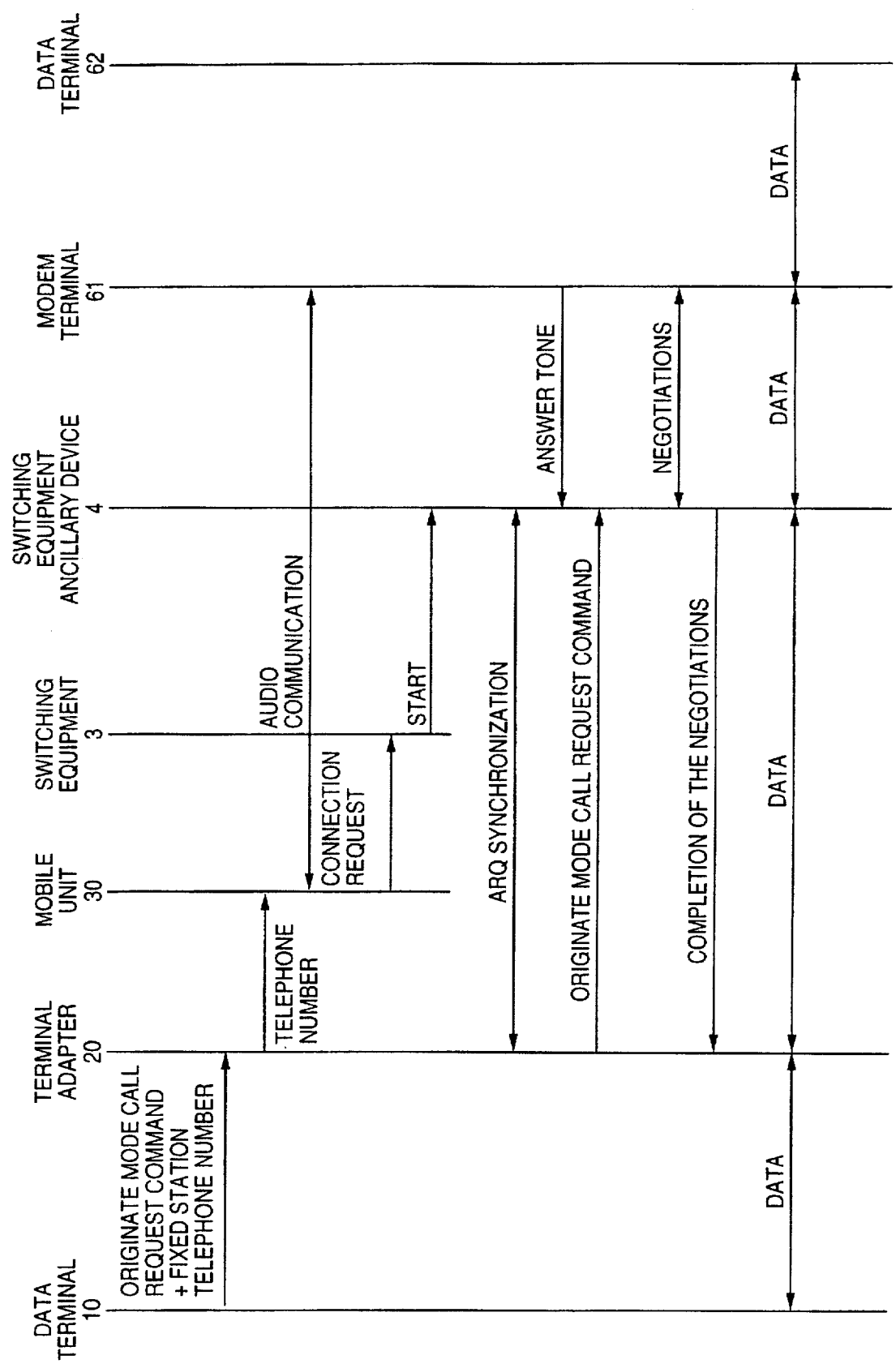
FIG. 3 is a sequence diagram showing an operation sequence for entering a mode of data communications in the data communication system shown in FIG. 2.

Entry into a mode of data communications between the mobile station 1 and the fixed station 6 will be described below with reference to FIG. 3.

The user enters data containing an originate mode call request command and a fixed station telephone number through the data terminal 10. The data are transmitted to the terminal adapter 20 in which the originate mode call request command and the fixed station telephone number are discriminated by the protocol controller 22.

The mobile unit 30 transmits the fixed station telephone number indicated by the protocol controller 22, and is connected to the fixed station 6.

Then, the protocol controller 22 sends a connection request through the mobile unit 30 to the switching equipment 3 for connection to the switching equipment ancillary device 4. The switching equipment ancillary device 4 is started by the switching equipment 3, establishing ARQ synchronization between the ARQ interfaces 23, 41. When the protocol controller 42 receives the originate mode call request command, the protocol controller 42 sets the modem interface 43 to an originate mode without waiting for a timeout condition of a timer.

When the incoming call from the mobile station 1 is detected by the modem terminal 61, the fixed station 6 automatically responds to transmit an answer tone to the switching equipment ancillary device 4 and operates in an answer mode.

Normally, modes for the modem interface 43 and the modem terminal 61 are established by call request commands sent respectively from the mobile station 1 and the data terminal 62.

When the modem interface 43 is set to an originate mode, negotiations for communication protocols are started between the switching equipment ancillary device 4 and the fixed station 6. Upon completion of the negotiations, the switching equipment ancillary device 4 transmits a negotiation signal to the terminal adapter 20, entering a mode of data communications.

In the mode of data communications, since the mobile station 1 has no modem function, only the modem interface 43 and the modem terminal 61 are synchronized with each other by a clock signal, and transmit and receive data therebetween.

A transmission delay caused by retransmission control which is effected on the communication line 2 is adjusted by flow control between the modem interface 43 and the modem terminal 61.

The protocol controller 42 corresponds to "means for controlling communication protocols matching transmission path characteristics between the switching equipment and the data terminal" and the modem interface 43 corresponds to "means for effecting data communications with analog data modems" and "means for effecting flow control upon data communications between the analog data modems".

While a preferred embodiment of the invention has been described using specific terms, such description is for illustrative purposes only, and it is to be understood that changes and variations may be made without departing from the spirit or scope of the following claims.

What is claimed is:

1. A terminal adapter for use in a mobile station of a data communication system, comprising:

a terminal interface unit configured to interface with a data terminal;

a protocol controller coupled to the terminal interface unit and configured to analyze and control a communication protocol control signal transmitted to and received from said data terminal; and an ARQ interface unit coupled to the protocol controller and the terminal interface unit and configured to effect ARQ control as an error correction control on a transmission path connected to switching equipment of the data communication system, wherein, upon output of an originate mode call request command and an accompanying destination telephone number from the data terminal, the protocol controller discriminates the outputted data and outputs the discriminated data according to a particular protocol format to the switching equipment, and wherein the protocol controller further outputs a connection request to the switching equipment for connection to a switching equipment ancillary device coupled to the switching equipment, so as to establish ARQ synchronization between the ARQ interface unit and the switching equipment ancillary device.

2. A switching equipment ancillary device for effecting data communications between switching equipment of a data communication system and a mobile station which includes a terminal adapter having an interface unit configured to interface with a data terminal, an analyzing and controlling unit configured to analyze and control a communication protocol control signal transmitted to and received from the data terminal, and an ARQ interface unit configured to control as an error correction control on a transmission path connected to the switching equipment, the switching equipment ancillary device comprising:

a controller configured to control communication protocols matching transmission path characteristics between the switching equipment and the data terminal; and a modem interface coupled to the controller and configured to effect data communications with a modem terminal at a destination location separate from the mobile station, the modem terminal being connected to a destination location via a telephone line;

wherein the modem interface effects flow control during the data communications with the modem terminal, and wherein clock synchronization is required only between the modem interface of the switching equipment ancillary device and the modem terminal to effect the data communications between the mobile station and the destination location.

3. A data communication system comprising:

switching equipment;

a mobile station connected to the switching equipment through a communication line, and including a data terminal, a mobile unit, and a terminal adapter having a terminal interface unit coupled to the data terminal and configured to analyze and control a communication protocol signal transmitted to and received from the data terminal, and an ARQ interface coupled to the terminal interface unit and configured to provide ARQ control as an error correction control on a transmission path connection to the switching equipment;

a fixed station connected to the switching equipment through a public telephone network and having a modem terminal and a data terminal; and a switching equipment ancillary device including a protocol controller configured to control communication protocols matching transmission path characteristics between the switching equipment and the data terminal, a modem interface coupled to the protocol controller and configured to effect data communications with an analog data modem, the modem interface also providing flow control during the data communications with the analog data modem.

wherein the analog data modem is located at a destination location which corresponds to a desired location of a call originated from the mobile station, and wherein clock synchronization is maintained only between the analog data modem at the destination location and the modem interface at the switching equipment ancillary device during the data communications between the mobile station and the destination location.

4. A data communication method carried out by a data communication system which includes a mobile station connected to a switching equipment through a communication path, the mobile station including a data terminal, a mobile unit, and a terminal adapter, the data communication system further including a fixed station communicatively connected to the switching equipment through a public telephone network, the fixed station having a modem terminal and a data terminal, and the data communication system still further including a switching equipment ancillary device connected to the switching equipment, the method comprising the steps of:

entering an originate mode call request command and a fixed station telephone number from the data terminal into the terminal adapter;

discriminating the originate mode call request command and the fixed station telephone number in the terminal adapter, and indicating the fixed station telephone number to the mobile unit;

transmitting the indicated fixed station telephone number from the mobile unit and connecting the mobile unit to the fixed station;

sending a connection request from the terminal adapter through the mobile unit to the switching equipment for connection to the switching equipment ancillary device;

starting the switching equipment ancillary device from the switching equipment to establish ARQ synchronization between the terminal adapter and the switching equipment ancillary device;

transmitting an answer tone from the fixed station to the switching equipment ancillary device when the incoming call from the mobile station is detected by the fixed station;

transmitting an originate mode call request command from the terminal adapter to the switching equipment ancillary device;

starting negotiations for communication protocols between the switching equipment ancillary device and the fixed station when the switching equipment ancillary device receives the originate mode call request command;

indicating completion of the negotiations from the switching equipment ancillary device to the terminal adapter when the negotiations are completed successfully; and transmitting and receiving data between the data terminal of the mobile station and the data terminal of the fixed station through the terminal adapter, the mobile unit, the switching equipment and the switching equipment ancillary device.

5. A data communication system according to claim 1, wherein the mobile station does not include a modem function, and wherein the switching equipment serves as the modem function for the mobile station for a data communications between the mobile station and a destination location.

6. A data communication system according to claim 2, wherein no clock synchronization is maintained at the mobile station during the data communications between the mobile station and the destination location.

7. A data communication system according to claim 3, wherein no clock synchronization is maintained at the mobile station during the data communications between the mobile station and the destination location.

8. A data communication system according to claim 2, wherein, when the controller receives an originate mode call request command from the mobile station to initiate a call setup to the destination location, the controller sets the modem interface to an originate mode, and wherein negotiations for communication protocols are then started between the modem interface in the originate mode and the destination location.

9. A data communication system according to claim 8, wherein, upon completion of the negotiations, the switching equipment ancillary device transmits a negotiations signal to the mobile station, so as to inform the mobile station that the data communications can be started between the mobile station and the destination location.

10. A data communication system according to claim 3, wherein, when the protocol controller receives an originate mode call request command from the mobile station to initiate a call setup to the destination location, the protocol controller sets the modem interface to an originate mode, and wherein negotiations for communication protocols are then started between the modem interface in the originate mode and the destination location.

11. A data communication system according to claim 10, wherein, upon completion of the negotiations, the switching equipment ancillary device transmits a negotiations signal to the mobile station, so as to inform the mobile station that the data communications can be started between the mobile station and the destination location.

* * * * *